(12) United States Patent
Adari et al.

(10) Patent No.: US 8,655,929 B2
(45) Date of Patent: Feb. 18, 2014

(54) MODIFICATION OF DATA WITHIN A FILE

(75) Inventors: Divakar Adari, Visakhapatnam (IN);
Savitri Hunasheekatti, Bangalore (IN);
Arun C. Ramachandran, Nadu (IN);
Lakshmanan Velusamy, TamilNadu (IN)

(73) Assignee: International Business Machines Corporation, Armonk, NY (US)

( * ) Notice: Subject to any disclaimer, the term of this patent is extended or adjusted under 35 U.S.C. 154(b) by 225 days.

(21) Appl. No.: 13/111,123

(22) Filed: May 19, 2011

(65) Prior Publication Data
US 2012/0296864 A1 Nov. 22, 2012

(51) Int. Cl.
*G06F 17/00* (2006.01)
*G06F 17/30* (2006.01)

(52) U.S. Cl.
USPC .......................................... 707/823; 707/830

(58) Field of Classification Search
USPC ................... 707/822, 830, 823; 711/100, 205
See application file for complete search history.

(56) References Cited

U.S. PATENT DOCUMENTS

| 5,548,757 | A | 8/1996 | Matsuyama et al. |
|---|---|---|---|
| 7,043,503 | B2 | 5/2006 | Haskin et al. |
| 8,145,604 | B2 * | 3/2012 | Day ................................ 707/648 |
| 8,219,741 | B2 * | 7/2012 | Condit et al. .................. 711/103 |
| 2008/0301203 | A1 | 12/2008 | Adkins et al. |
| 2009/0210614 | A1 | 8/2009 | Gorobets |
| 2010/0287218 | A1 | 11/2010 | Hu et al. |

OTHER PUBLICATIONS

Add Some Content to a File, FOSSPLANET , vBulletin Solutions, Inc., Jan. 28, 2011, website URL: htttp://fossplant.com/f14/add-some-content-file-28774/.
xfs: Introduce XFS_IOC_ZERO_RANGE, Dave Chinner, Mar. 3, 2011, website URL: http://git.kernel.org/?p=linux/kernel/git/torvalds/linux-2.6.git;a=commit;h=447223520520b.
pwrite(2)—Linux man page, Mar. 3, 2011, website URL: http://linux.die.net/man/2/pwrite.

\* cited by examiner

*Primary Examiner* — Marc Filipczyk
(74) *Attorney, Agent, or Firm* — Olive Law Group, PLLC (57) ABSTRACT

Disclosed herein are methods, systems, and computer program products for managing data within a file system. In embodiments, the method includes determining the location of data within a file to be modified, modifying the data within the file, and adjusting a pointer to point to the data block containing the modified data. The data within a file may be modified by deleting data from the file or inserting new data into the file. New data may be inserted into a file by writing the data into new data blocks and then adjusting the pointers to point to the location of the new data blocks. An example method may also include determining whether data blocks are incomplete blocks and identifying the incomplete blocks by negating the value of the pointers to those blocks.

20 Claims, 8 Drawing Sheets

MODIFICATION OF DATA WITHIN A FILE

BACKGROUND

1. Field of the Invention

The present invention relates to managing data within a file system, and more specifically, methods and systems for modifying data within files in a file system.

2. Description of Related Art

The modification of data within a file in a file system that is used by an operating system can be very complex. In various operating systems, an index node (inode) data structure is used. An inode contains information about a file, directory, or other file system object that is necessary to get data from a storage device, such information may include file type, permissions, ownership, file size, and the like. An inode contains direct pointers that point directly to disk blocks on the storage device, which may also be referred to as data blocks. The actual file data is located in the data blocks. An inode may also contain an indirect pointer, double indirect pointer, triple indirect pointer, and the like. An indirect pointer points to a block of direct pointers. A double indirect pointer points to a block of indirect pointers, and a triple indirect pointer points to a block of double indirect pointers. A typical inode may include 10 direct pointers, one indirect pointer, one double indirect pointer, and one triple indirect pointer. Using this structure, an inode can represent a very large file.

The process of modifying a file can be very time consuming. For example, if there is data to insert in a file, one approach utilizes a temporary file. The data from the beginning of the modified file up to the point of insertion is first copied into the temporary file. The data to be inserted is then copied into the temporary file, and finally the remaining data in the modified file is copied into the temporary file. This approach requires the use of resources and additional data storage to create and store the temporary file. In a second approach, two buffers are utilized to recursively shift data from the point of insertion to the end of the file based on the amount of bytes to be inserted in the file. These approaches can be easy to implement; however, large amounts of time and resources are wasted, especially when modifying a large file to insert or delete just a few bytes of data. Accordingly, there is a need for an improved method and system for modifying data within a file in a file system.

BRIEF SUMMARY

In accordance with one or more embodiments of the present invention, methods and systems disclosed herein provide for managing data within a file system. An example method includes determining a location of data within a file to be modified, modifying the data within the file, and adjusting a pointer to point to the location of a data block containing the modified data. A file may be modified by deleting data from the file or inserting new data into the file by writing the new data into a new data block and then adjusting a pointer to point to the location of the new data block.

In accordance with embodiments of the present invention, a method may include determining whether a data block is an incomplete block in response to determining that the amount of data in the block is less than the size of the data block. If a data block is incomplete, the method may include determining the amount of data to write to the incomplete block, writing the amount of data to be written to the incomplete block to a predetermined location in the incomplete block, writing the data to the incomplete block, and negating the value stored in a pointer that points to the location of the incomplete block in order to identify the data block as an incomplete block. The method may also include adjusting the pointers that follow the pointer to the data block containing the modified data.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium (including, but not limited to, non-transitory computer readable storage media). A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter situation scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1A:
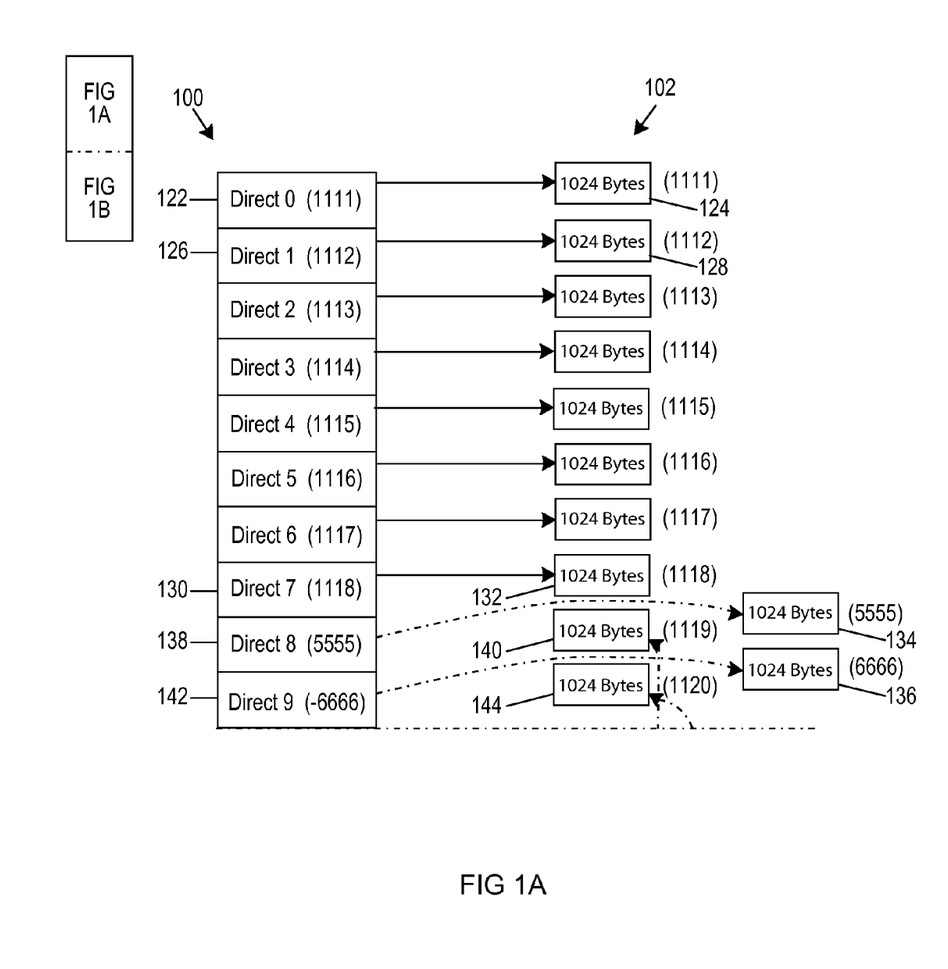
FIGS. 1A and 1B are block diagrams illustrating processes for modifying data within a file in accordance with embodiments of the present invention.
Figure 1B:
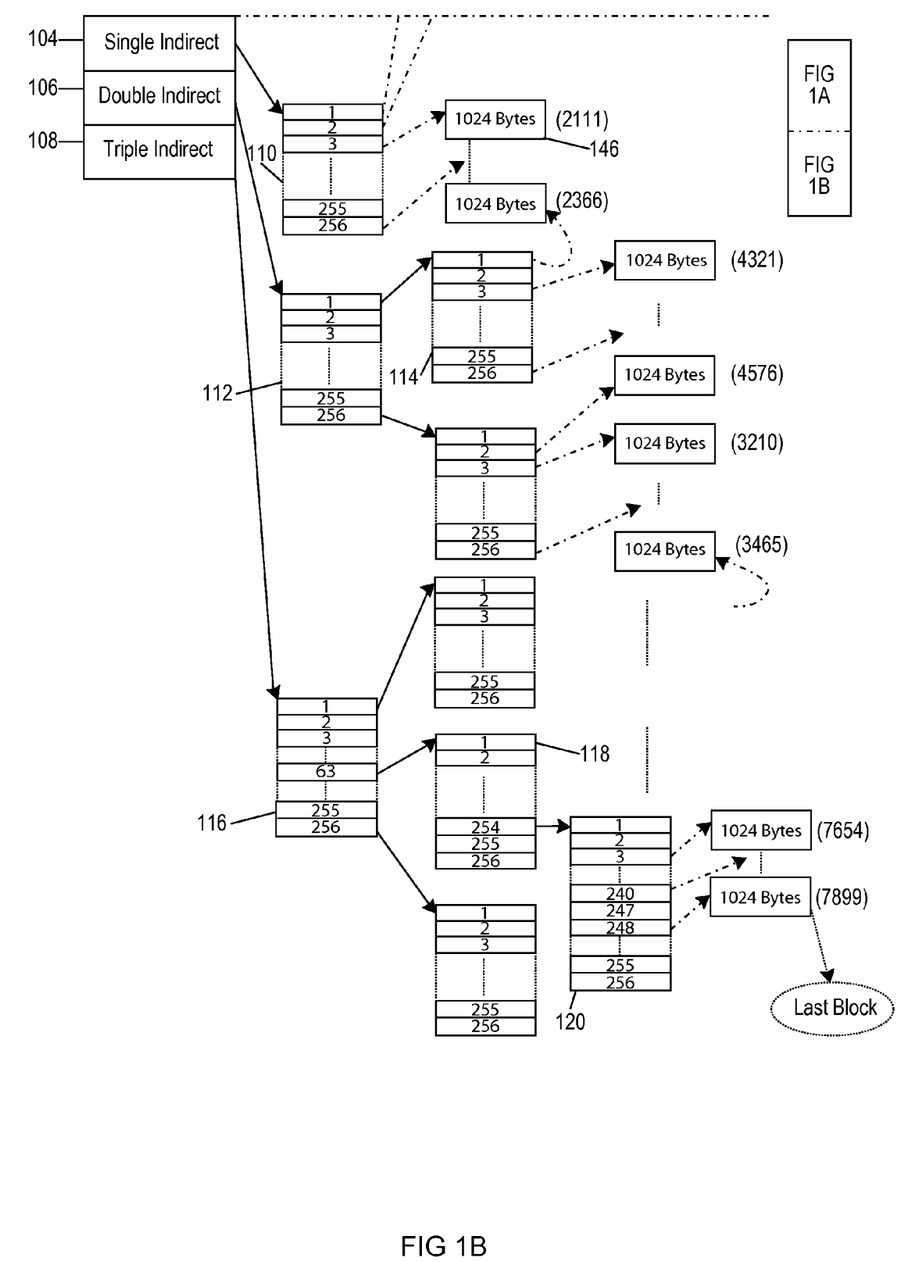

FIGS. 1A and 1B is a block diagram illustrating a process for modifying data within a file in accordance with embodiments of the present invention. In this example process, an inode data structure is used with pointers that point to disk blocks, also referred to as data blocks, on a storage device. Ten direct pointers 100 are shown that point directly the data blocks 102. For the purpose of illustration, the data blocks 102 are 1024 bytes (1K) each. However, as will be understood by one skilled in the art, the size of the data blocks may vary based on the addressing scheme being used. As shown in FIG. 1A, a direct 0 pointer 122 points to a data block 124, which is disk block number 1111 on the storage device. The disk block numbers shown in FIGS. 1A and 1B are provided for the purpose of illustration. Typically, a file system randomly selects free disk blocks on the storage device and uses them as needed.

Referring to FIG. 1B, a single indirect pointer 104, a double indirect pointer 106, and a triple indirect pointer 108 are also shown. The single indirect pointer 104 points to a block of direct pointers 110. The double indirect pointer 106 points to a block of indirect pointers 112 that point to a block of direct pointers 114. The triple indirect pointers 108 point to a block of double indirect pointers 116 that point to a block of single indirect pointers 118 that point to a block of direct pointers 120. Assuming that a pointer in a file system can hold 1K bytes and that a data block is addressable by a 32-bit integer, a pointer can hold up to 256 block numbers as is shown by the single indirect pointer 104 and the block of direct pointers 110. The maximum number of bytes that may be held in a file is well over 16 G bytes, using 10 direct pointers, one single indirect pointer, one double indirect pointer, and one triple indirect pointer, as will be understood by one skilled in the art.

As referred to previously, the direct 0 pointer 122 points to the data block 124 which holds the first 1K bytes (1-1024) of data storage. A direct 1 pointer 126 points to a data block 128 that holds the second 1K bytes (1025-2048) of data storage. A byte offset is the distance from the beginning of the data storage to a particular point in the data storage. If a computer process required the modification of data within a file at byte offset 8000, a direct 7 pointer 130 may point to a data block 132 where the modification point is located because bytes 7169-8192 may be stored in that data block. More specifically, the modification point may be at location 832 in the data block 132. In one or more embodiments of the present invention, data can be modified by inserting or deleting the data in the file at byte offset 8000 without having to copy or move large portions of the existing file data.

For example, if 2000 bytes are to be inserted at byte offset 8000 in a large file, the 2000 bytes may be inserted starting at location 832 in the data block 132. The remaining 192 bytes in that data block 132 from the insertion point to the end of the block may be stored, and then 192 bytes of new data may be inserted from the insertion point until the end of the data block 132. Two new data blocks, data block 134 and data block 136, may be used to copy the next 1024 bytes into the new data block 134 and the remaining 784 bytes into the new data block 136. The previously stored 192 bytes copied from data block 132 may then be copied into the new data block 136. Since only 976 bytes (784+192) of the new data block 136 are used, the data block 136 may be an incomplete block.

In embodiments of the present invention, incomplete blocks are identified and processed in such a way as to enable the file system to properly access and use the data within the data block. For incomplete blocks, the amount of data in the block is written and stored in a predetermined location in the block, such as in the first few bytes of the data block. The data to be stored in the data block may then be written to the block. The value of the pointer pointing to the incomplete block may then be negated to identify the data block as an incomplete block to the file system. The pointer value may be negated by using the −ve operation or by multiplying the value by −1.

Referring again to FIGS. 1A and 1B and using the example above, the new data block 134 is disk block number 5555 on the storage device and the new data block 136 is disk block number 6666 on the storage device. After the new data is inserted into the file, the pointers may be updated. The direct 8 pointer 138 may be updated to point to new data block 134 by writing the disk block number 5555 to the pointer. The direct 9 pointer 142 may be updated to point to new data block 136 by writing the disk block number 6666 to the pointer. Since data block 136 is an incomplete block the value in the direct 9 pointer 142 may be negated to indicate that it is an incomplete block to the file system. The pointers following the direct 9 pointer 142 until the last data block in the inode may then be adjusted to shift all of the pointers down in order to account for the addition of two new data blocks. For example, the 1st and 2nd direct pointers in the block of direct pointers 110 are adjusted to point to data block 140 and data block 144. Modifying data within a file as described in one or more embodiments herein by adding or deleting data blocks and adjusting the pointers instead of pushing down the contents of the file is efficient and can save time and resources.

Figure 2A:
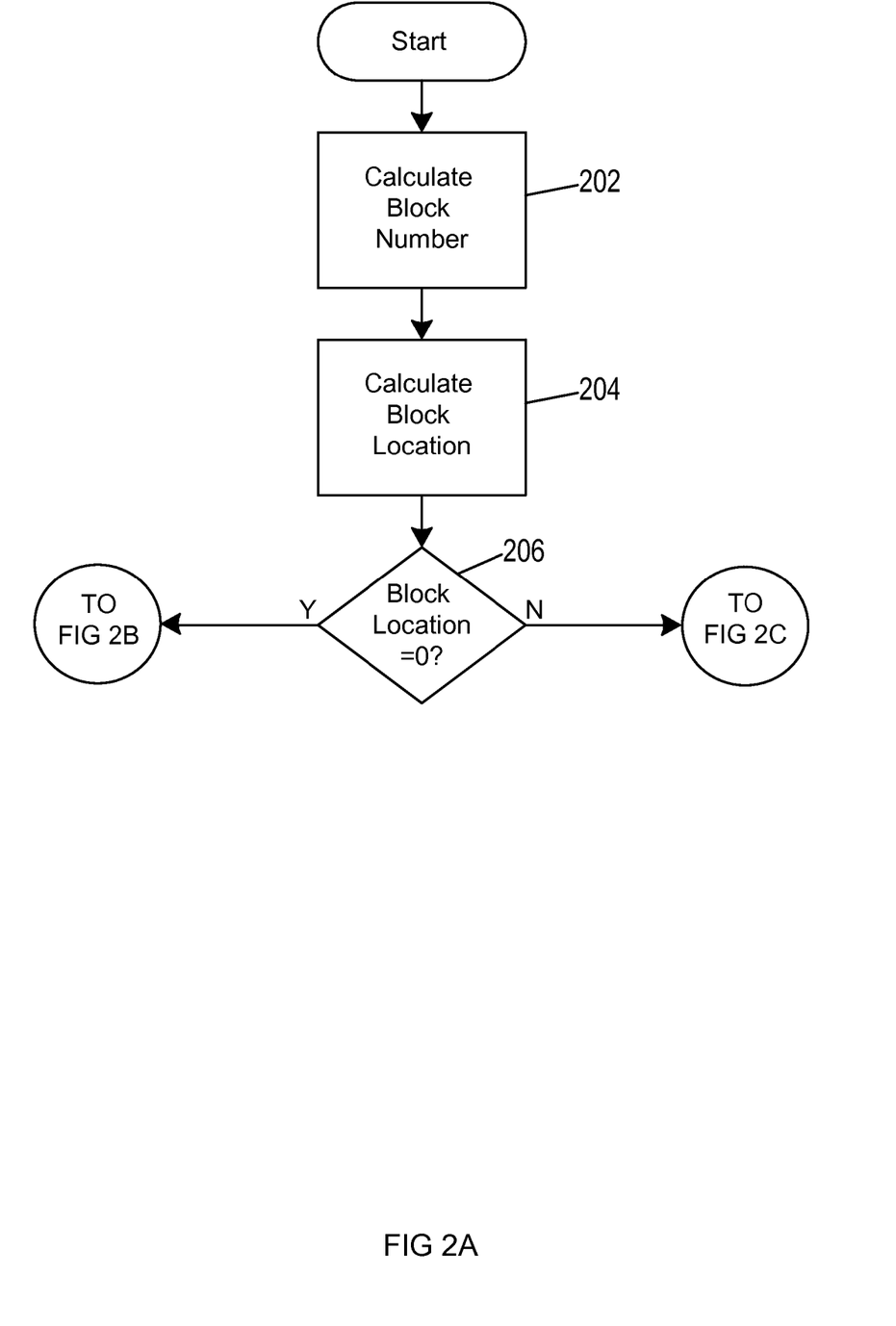
FIGS. 2A, 2B, and 2C are flowchart diagrams illustrating a method for inserting data into a file in accordance embodiments of the present invention.
Figure 2B:
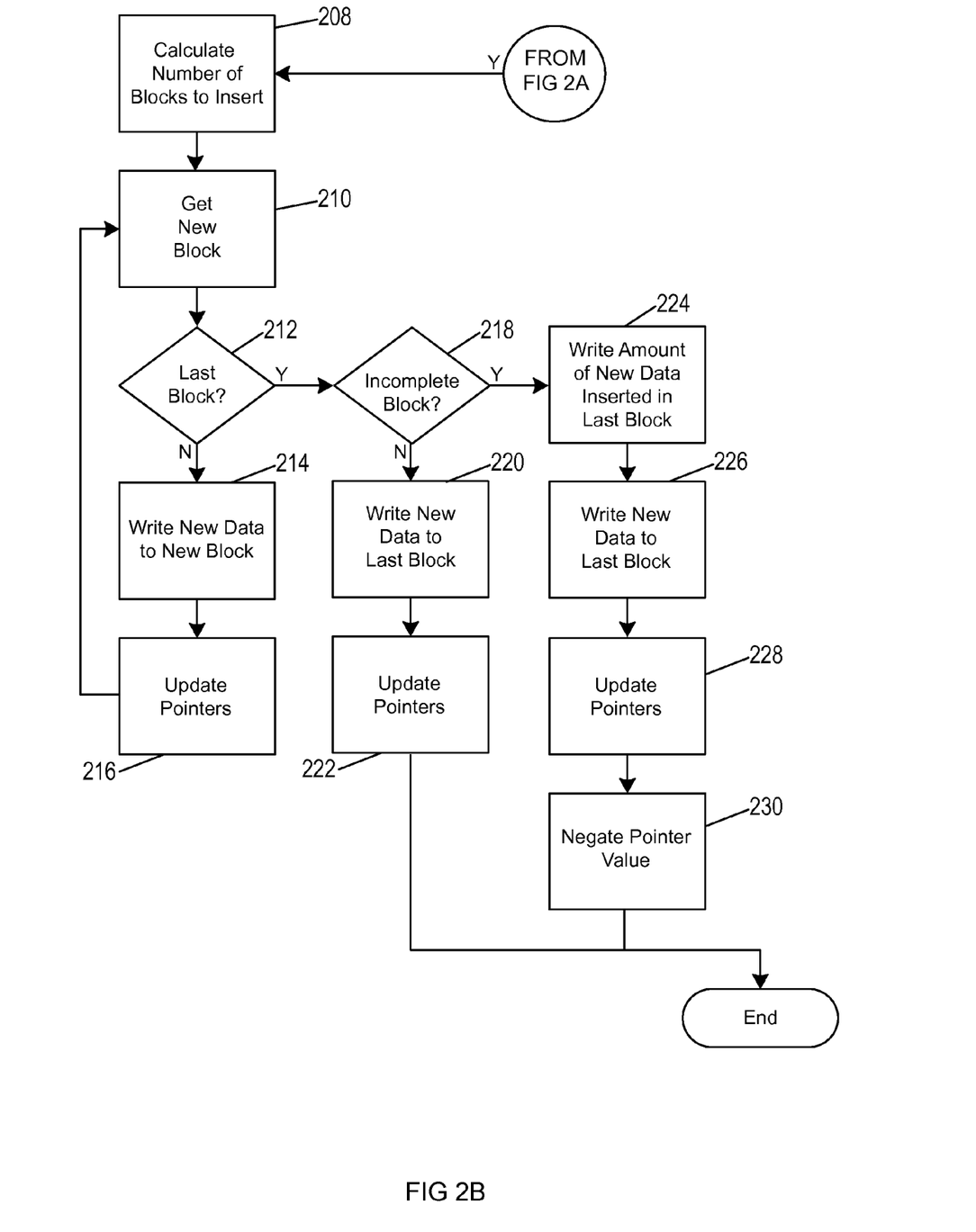
Figure 2C:
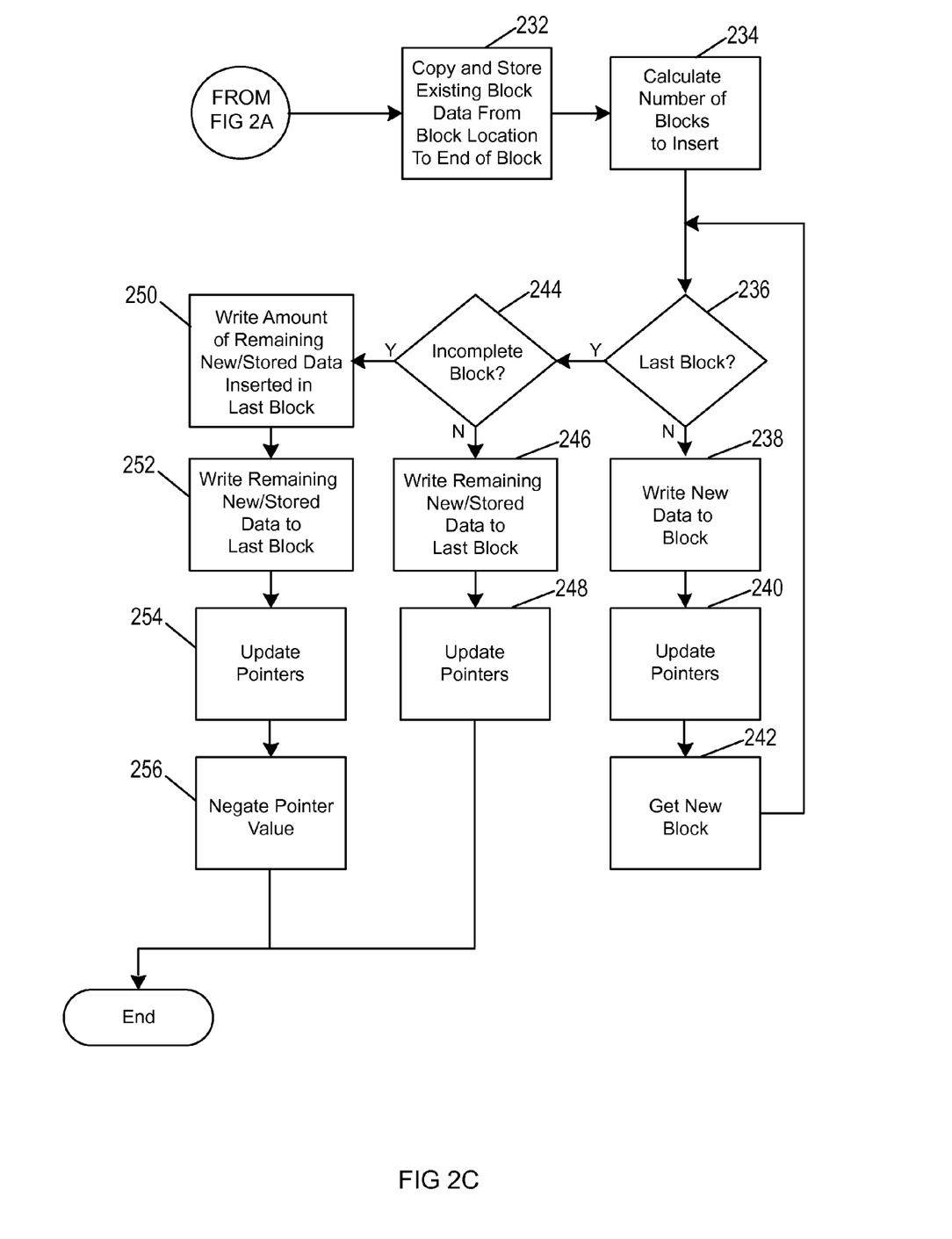

FIGS. 2A, 2B, and 2C are flowchart diagrams illustrating a method for inserting data into a file in accordance with embodiments of the present invention. The method may include calculating 202 the block number to be modified. The block number may be calculated using the following equation:

Block Number=Byte Offset/Data Block Size

The method may also include calculating 204 the block location. The block location may be calculated using the following equation:

Block Location=Byte Offset % Data Block Size

The modulus operation (%) returns the remainder when a first number is divided by a second number. If the value of the block location at block 206 equals zero, the new data may be inserted at the beginning of new data block. If the value of the block location is not equal to zero, the new data may be inserted in the middle of a data block. The method may continue in FIG. 2B at block 208 to calculate the number of data blocks to insert. The number of new blocks to insert may be calculated using the following equation:

Number of New Blocks=Amount of Data to Insert/ Data Block Size

After a determination is made about the number of new blocks to insert, the method may include getting 210 a new data block. Subsequently, the method may include determining 212 whether the current new block is the last block. In response to determining that the current block is not the last block, the new data may be written to the new data block at block 214. The method may include updating 216 the pointers and getting 210 a new block. If the current block at block 212 is the last block, the method includes determining 218 whether the last block is an incomplete block. The following equation may be used to determine if there is an incomplete block:

Incomplete Block=Amount of Data to Insert % Data Block Size

If the result of the modulus operation is zero, it may be interpreted to mean that there will not be an incomplete block. In response to determining that the last block is not an incomplete block, the method includes writing 220 the new data to the last data block. The method further includes updating 222 the pointers and subsequently the method may end. In response to determining that the last block is an incomplete block, the method may include writing 224 the amount of data to be inserted into the last block. Subsequently, the method includes writing 226 the new data to the last block. The method also includes updating 228 the pointers. Further, the method includes negating 230 the pointer value to the incomplete block to identify the data block as an incomplete block to the file system.

Referring again to FIG. 2A at block 206, in response to determining that the value of the block location does not equal zero, the method includes inserting new data in the middle of a data block. The method may continue in FIG. 2C at block 232 where the method includes copying and storing the existing data from the block location to the end of the block. Subsequently, the method includes calculating 234 the number of data blocks to insert. The number of new blocks to insert may be calculated using the following equation:

Number of New Blocks=Ceil(Amount of Data to Insert/Data Block Size)

The ceil operation returns the smallest integer greater than or equal to the quotient. For example, if the quotient is 1.00001, the number of new blocks to insert will be two. If the quotient is exactly 1.0000, the number of new blocks to insert will be one.

After a determination is made about the number of new blocks to insert, the method may include determining 236 whether the current block is the last block. In response to determining that the current block is not the last block, the method includes writing 238 the new data to the data block. The method includes updating 240 the pointers, and then getting 242 a new data block and returning to block 236 to determine whether the new data block is the last block. In response to determining that the current block at block 236 is the last block, the method includes determining 244 whether the last block is an incomplete block. In response to determining that the last block is not an incomplete block, the method includes writing 246 the remaining new data and the remaining stored data to the last block. Subsequently, the method includes updating 248 the pointers followed by the method ending. In response to determining that the last block is an incomplete block, the method includes writing 250 the amount of remaining new data and the remaining stored data to be inserted into the last block, and then writing 252 the remaining new data and remaining stored data to the last block. The method includes updating 254 the pointers, and then negating 256 the pointer value to the incomplete block to identify the data block as an incomplete block to the file system.

Figure 3A:
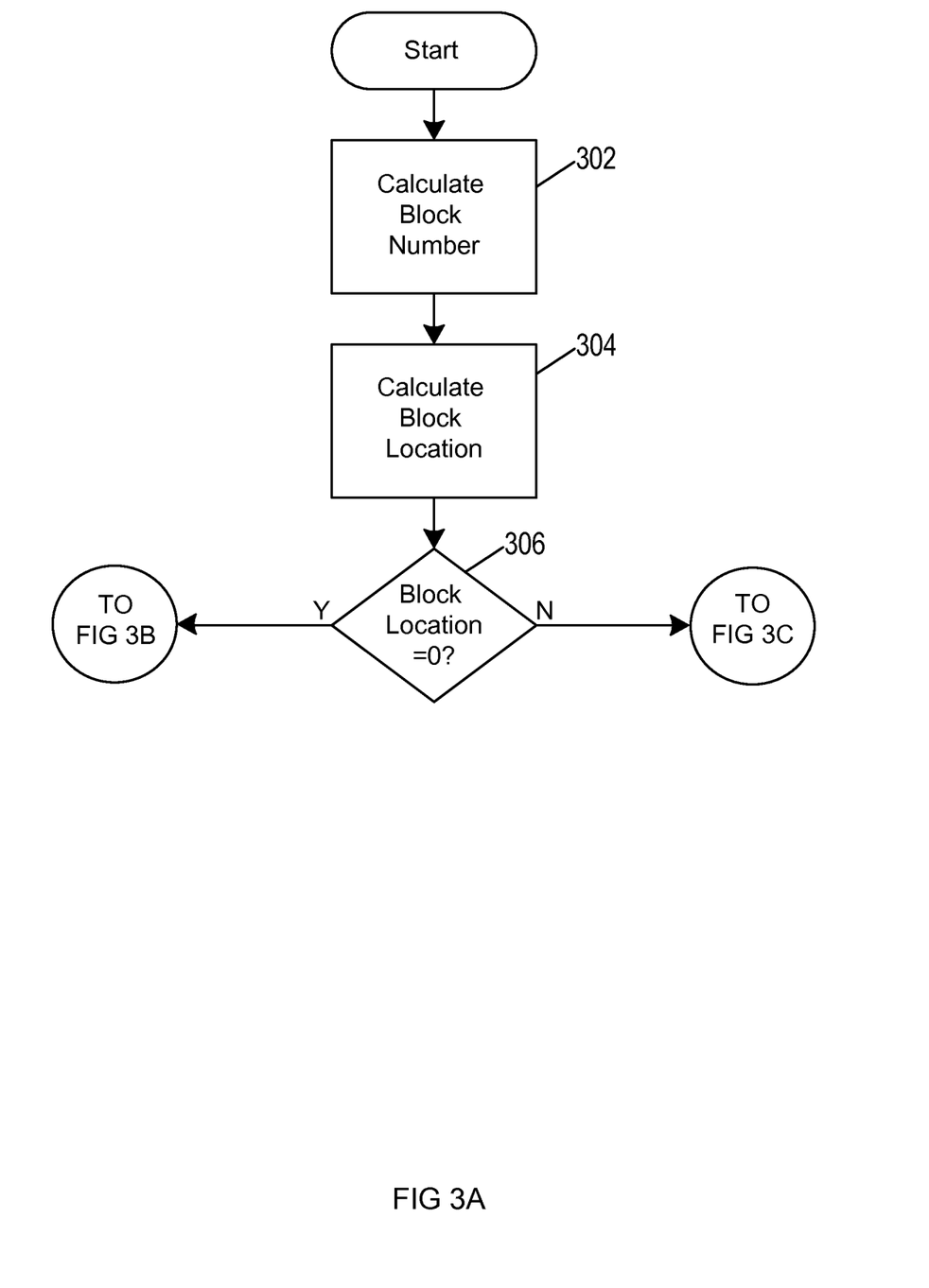
FIGS. 3A, 3B, and 3C are flowchart diagrams illustrating a method for deleting data from a file in accordance with embodiments of the present invention.
Figure 3B:
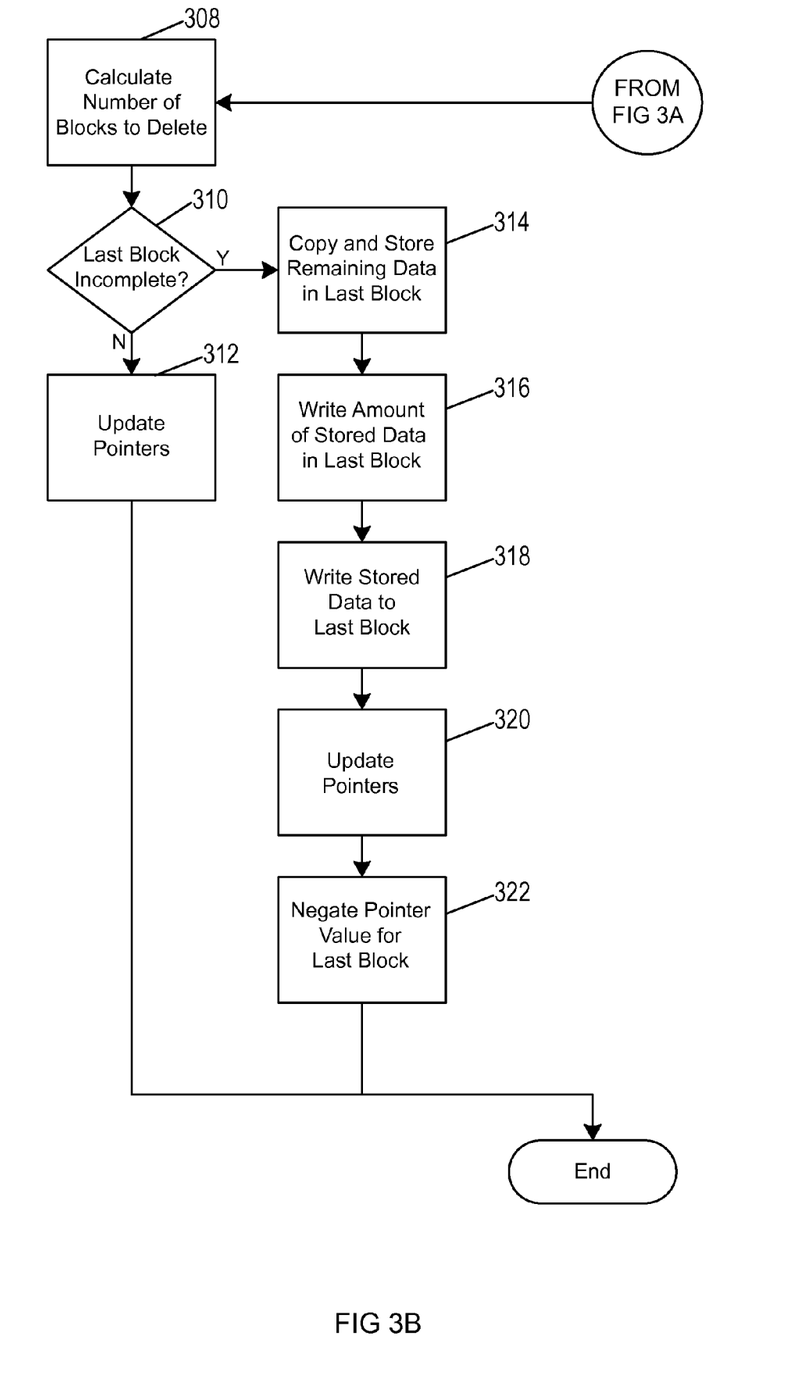
Figure 3C:
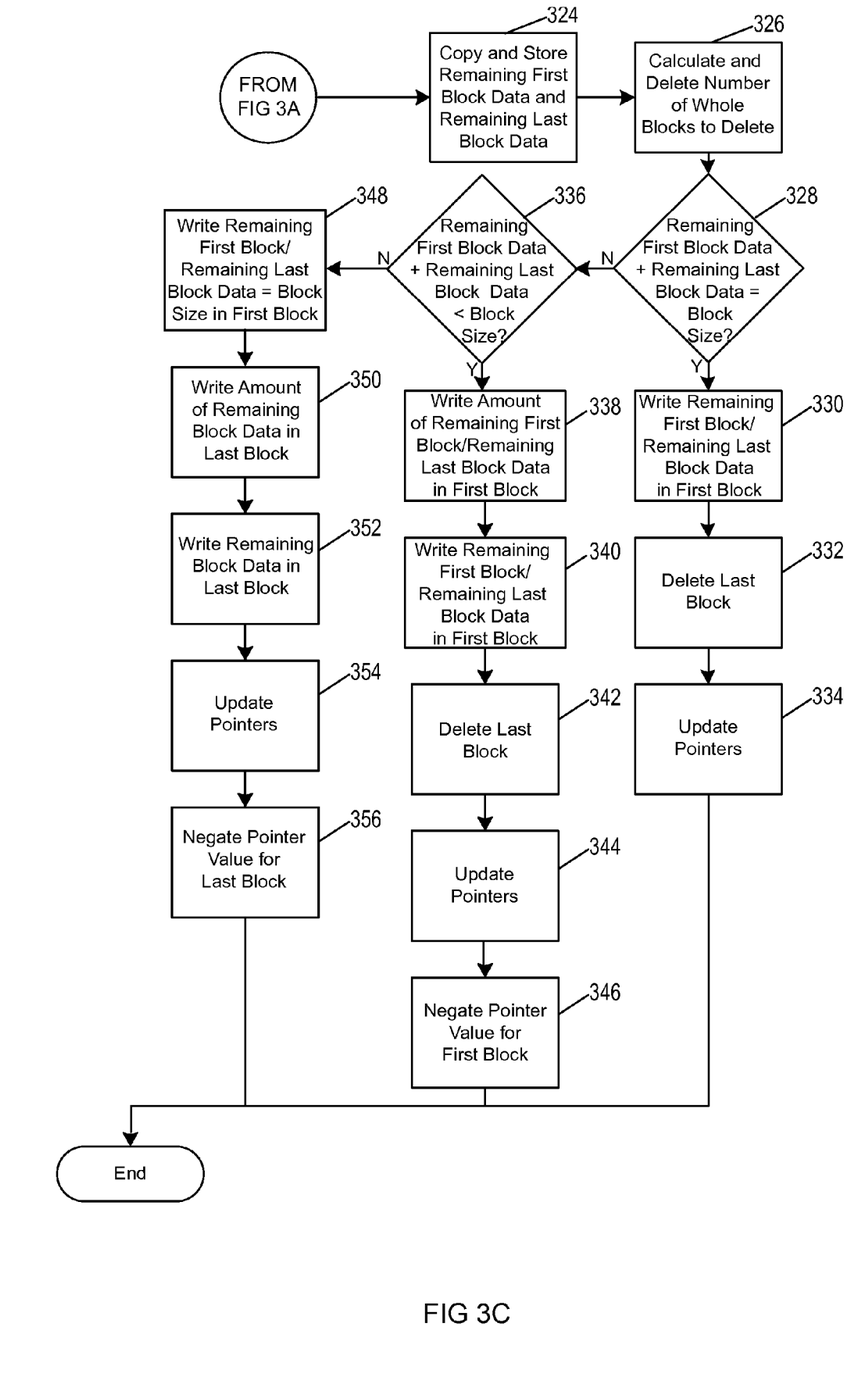

FIGS. 3A, 3B, and 3C are flowchart diagrams illustrating a method for deleting data from a file in accordance with embodiments of the present invention. The method may include calculating 302 the block number to be modified. The block number may be calculated using the following equation:

Block Number=Byte Offset/Data Block Size

The method includes calculating 304 the block location. The block location may be calculated using the following equation:

Block Location=Byte Offset % Data Block Size

The modulus operation (%) returns the remainder when a first number is divided by a second number. In response to determining that the value of the block location at block 306 equals zero, the data to be deleted is at the beginning of data block. If the value of the block location is not equal to zero, the data to be deleted is in a data block. The method includes calculating 308 the number of data blocks to delete. The number of blocks to delete may be calculated using the following equation:

Number of Blocks to Delete=Amount of Data to Delete/Data Block Size

After a determination is made about the number of blocks to delete, the method includes determining 310 whether the last block is an incomplete block. In response to determining that the last block is not an incomplete block, the method includes updating 312 the pointers to push the pointers up by the number of blocks deleted and subsequently the method may end. In response to determining that the last block is incomplete, the method may include copying and storing 314 the remaining data in the last block, writing 316 the amount of stored data in the last block, and then writing 316 the stored data to the last block. The method may include updating 320 the pointers, and then negating 322 the pointer value to the last block to identify the data block as an incomplete block to the file system.

Referring again to FIG. 3A at block 306, in response to determining that the value of the block location does not equal zero, the data may be deleted from the middle of a data block. The method also includes copying and storing 324 the remaining first block data and the remaining last block data. Subsequently, the method may include calculating and deleting 326 the number of whole blocks to delete. The number of whole blocks to delete may be calculated using the following equation:

Whole Blocks to Delete=(Amount of Data to Delete−Block Location+1)/Data Block Size The method may include determining 328 whether the remaining data in the first block plus the remaining data in the last block is equal to the data block size. With regard to the first and last blocks, the point where the deletion of data begins is in the first block and the point where the deletion of data ends is in the last block. If the beginning and ending points of the deletion are in the middle of the first and last data blocks, both blocks may have data remaining in each block that may need to be combined. If the remaining first block data plus the remaining last block data is equal to the data block size, all of the data from the first and last blocks can fit into one data block. If the remaining first and last block data is less than the data block size, all of the remaining data can be written into one data block; however, the data block will be an incomplete block. If the remaining first and last block data is greater than the block size, two data blocks may be needed to hold the remaining data, and one of those data blocks may be an incomplete block.

Returning now to block 328 in FIG. 3C, in response to determining that the remaining first block data plus the remaining last block data is equal to the data block size, the method includes writing 330 the remaining first block data and remaining last block data into the first block. The method also includes deleting 332 the last block at block, and subsequently updating 334 the pointers. In response to determining that the remaining first block data plus the remaining last block data is not equal to the data block size, the method includes determining 336 whether the remaining first block data plus the remaining last block data is less than the data block size. In response to determining that the remaining first block data plus the remaining last block data is less than the data block size, the data block may be an incomplete block, and the method may include writing 338 the amount of remaining first block data and remaining last block data into the first block, writing 340 the remaining first block data and remaining last block data into the first block, and then deleting 342 the last block. The method also includes updating 344 the pointers, and then negating 346 the pointer value to the first block, which is incomplete block, to identify the first block as an incomplete block to the file system.

In response to determining that the remaining first block data plus the remaining last block data is not less than the data block size, two data blocks may be needed to hold the remaining data. The method may include writing 348 an amount of remaining first block data and remaining last block data equal to the data block size to the first block. The method may include writing 350 the amount of remaining block data to the last block. The method may include writing 352 the remaining data to the last block. The method also includes updating 354 the pointers, and then negating 356 the pointer value to the last block to identify the last block as an incomplete block to the file system.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method for managing data within a file system, the method comprising:
 using at least one processor for:
  determining the location of data within a file to be modified;
  modifying the data within the file such that a data block containing the data is an incomplete block;
  adjusting at least one pointer to point to the location of the data block containing the modified data;
  negating a value stored of the at least one pointer that points to the location of the incomplete block to identify the data block as an incomplete block;

determining whether the value of the at least one pointer identifies the data block as an incomplete block based on the value of the at least one point; and managing one of insertion and deletion of data within the file based on whether the value of the at least one pointer identifies the data block as an incomplete block.

2. The method of claim 1 further comprising determining whether one of another data block and the data block is an incomplete block.

3. The method of claim 2 further comprising, in response to determining that one of another data block and the data block is an incomplete block:

determining an amount of data to write to the incomplete block;

writing the amount of data to be written to the incomplete block to a predetermined location in the incomplete block; and writing the data to the incomplete block.

4. The method of claim 1 further comprising adjusting at least one additional pointer following the at least one pointer that points to the location of the data block containing the modified data.

5. The method of claim 1 wherein modifying the data within the file further comprises writing new data into at least one new data block to insert the new data into the file.

6. The method of claim 5 further comprising adjusting the location of another pointer to point to the location of the at least one new data block.

7. The method of claim 1 wherein modifying the data within the file further comprises deleting data from the file.

8. A system for managing data within a file system, the system comprising:

using at least one processor configured to:

determine the location of data within a file to be modified;

modify the data within the file such that a data block containing the data is an incomplete block;

adjust at least one pointer to point to the location of the data block containing the modified data;

negate a value stored of the at least one pointer that points to the location of the incomplete block to identify the data block as an incomplete block;

determine whether the value of the at least one pointer identifies the data block as an incomplete block based on the value of the at least one point; and manage one of insertion and deletion of data within the file based on whether the value of the at least one pointer identifies the data block as an incomplete block.

9. The system of claim 8 further configured to determine whether one of another data block and the data block is an incomplete block.

10. The system of claim 9 further configured to, in response to determining that one of another data block and the data block is an incomplete block:

determine an amount of data to write to the incomplete block;

write the amount of data to be written to the incomplete block to a predetermined location in the incomplete block;

write the data to the incomplete block.

11. The system of claim 8 further configured to adjust at least one additional pointer following the at least one pointer that points to the location of the data block containing the modified data.

12. The system of claim 8 further configured to write new data into at least one new data block to insert the new data into the file.

13. The system of claim 12 further configured to adjust the location of another pointer to point to the location of the at least one new data block.

14. The system of claim 8 further configured to delete data from the file.

15. A computer program product for managing data within a file system, said computer program product comprising:

a non-transitory computer readable storage medium having computer readable program code embodied therewith, the computer readable program code comprising:

computer readable program code configured to:

determine the location of data within a file to be modified;

modify the data within the file such that a data block containing the data is an incomplete block;

adjust at least one pointer to point to the location of the data block containing the modified data;

negate a value stored of the at least one pointer that points to the location of the incomplete block to identify the data block as an incomplete block;

determine whether the value of the at least one pointer identifies the data block as an incomplete block based on the value of the at least one point; and manage one of insertion and deletion of data within the file based on whether the value of the at least one pointer identifies the data block as an incomplete block.

16. The computer program product of claim 15 further configured to:

determine whether one of another data block and the data block is an incomplete block;

determine an amount of data to write to the incomplete block;

write the amount of data to be written to the incomplete block to a predetermined location in the incomplete block;

write the data to the incomplete block.

17. The computer program product of claim 15 further configured to adjust at least one additional pointer following the at least one pointer that points to the location of the data block containing the modified data.

18. The computer program product of claim 15 further configured to write new data into at least one new data block to insert the new data into the file.

19. The computer program product of claim 18 further configured to adjust the location of another pointer to point to the location of the at least one new data block.

20. The computer program product of claim 15 further configured to delete data from the file.

* * * * *